(12) United States Patent
Tyagi et al.

(10) Patent No.: US 8,280,955 B1
(45) Date of Patent: Oct. 2, 2012

(54) SYSTEMS AND METHODS FOR HANDLING CLIENT-SERVER COMMUNICATIONS

(75) Inventors: Prabhat Tyagi, Maharastra (IN); Hetal Rach, Maharastra (IN); Poornachandra Rao Presala, Andhra Pradesh (IN)

(73) Assignee: Symantec Corporation, Mountain View, CA (US)

( * ) Notice: Subject to any disclaimer, the term of this patent is extended or adjusted under 35 U.S.C. 154(b) by 278 days.

(21) Appl. No.: 12/836,818

(22) Filed: Jul. 15, 2010

(51) Int. Cl.
 *G06F 15/16* (2006.01)
(52) U.S. Cl. ......... 709/203; 709/201; 709/223; 370/329
(58) Field of Classification Search .................. 709/201, 709/203, 223; 370/329
 See application file for complete search history.

(56) References Cited

U.S. PATENT DOCUMENTS

| | | | |
|---|---|---|---|
| 7,120,806 B1 * | 10/2006 | Codilian et al. | 713/320 |
| 7,526,543 B2 * | 4/2009 | Stallings | 709/223 |
| 7,783,573 B2 * | 8/2010 | Griffin et al. | 705/50 |
| 7,908,479 B2 * | 3/2011 | Nakano et al. | 713/168 |
| 7,916,692 B2 * | 3/2011 | Yoshida | 370/329 |
| 7,941,578 B2 * | 5/2011 | Kimoto et al. | 710/52 |
| 8,180,907 B1 * | 5/2012 | Seshadri et al. | 709/228 |
| 2009/0181772 A1 * | 7/2009 | Hargreaves et al. | 463/42 |
| 2009/0221264 A1 * | 9/2009 | Minami et al. | 455/410 |
| 2011/0296015 A1 * | 12/2011 | Chakravarty et al. | 709/224 |

* cited by examiner

*Primary Examiner* — Wing Chan
*Assistant Examiner* — Tesfay Yohannes
(74) *Attorney, Agent, or Firm* — Advantedge Law Group (57) ABSTRACT

A computer-implemented method for handling client-server communications. The method may include 1) receiving, at a client system, a first command whose execution involves sending a first request to a server from a first transitory process associated with the first command; 2) initializing, on the client system, a communication proxy configured to relay communications between the server and transitory processes on the client system; 3) establishing a connection between the communication proxy and the server; 4) authenticating the communication proxy with the server; 5) establishing an inter-process communication channel configured to enable communication between the communication proxy and the transitory processes; 6) sending the first request from the first transitory process to the communication proxy over the inter-process communication channel; and 7) relaying the first request to the server via the connection between the communication proxy and the server. Various other methods, systems, and computer-readable media are also disclosed.

16 Claims, 7 Drawing Sheets

SYSTEMS AND METHODS FOR HANDLING CLIENT-SERVER COMMUNICATIONS

BACKGROUND

Because of increased application complexity and the need for highly available and scalable systems, IT enterprises have turned to various types of distributed computing systems for their IT infrastructures. Common distributed computing system configurations include cloud computing systems, clustered computing systems, and grid computing systems. Typical distributed computing systems may involve the exchange of various communications between individual computing systems that make up the distributed computing system. Such communications generally come in the form of requests from client systems and responses from servers.

In typical client-server architectures, the processes that handle client-server communications may perform certain common functions apart from exchanging requests and responses. For example, before a client system can send a request to a server, a connection must be established, the client may be required to authenticate with the server, and the connection may be secured (e.g., encrypted). Additionally, after the request is sent and a response is received, the connection may be closed, which may include connection cleanup by both the client system and the server.

In situations where the time used to exchange the request and response is short, the overhead of the common functions may be responsible for the majority of system resources consumed. Accordingly, the instant disclosure addresses a need for systems and methods that handle client-server communications in a more efficient and effective manner.

SUMMARY

As will be described in greater detail below, the instant disclosure generally relates to systems and methods for handling client-server communications. Embodiments of the instant disclosure may improve the performance of client-server communications by using a communication proxy (e.g., an intermediate process) that keeps active an authenticated connection between a client system and a server. For example, a computer-implemented method for handling client-server communications may include: 1) receiving, at a client system, a first command whose execution involves sending a first request to a server from a first transitory process associated with the first command, 2) initializing, on the client system, a communication proxy configured to relay communications between the server and transitory processes on the client system, 3) establishing an inter-process communication channel (e.g., a UNIX domain socket) configured to enable communication between the communication proxy and the transitory processes, 4) establishing a connection between the communication proxy and the server, 5) authenticating the communication proxy with the server, 6) sending the first request from the first transitory process to the communication proxy over the inter-process communication channel, and 7) relaying the first request to the server via the connection between the communication proxy and the server.

To optimize client-server communications, the method may then reuse the authenticated connection with the server for sending additional requests to the server. For example the method may further include: 1) receiving, at the client system, a second command whose execution involves sending a second request to the server from a second transitory process associated with the second command, 2) determining that the communication proxy is running on the client system (perhaps by attempting to connect to the inter-process communication channel), 3) sending the second request from the second transitory process to the communication proxy over the inter-process communication channel, and 4) relaying the second request to the server via the connection between the communication proxy and the server.

The first command may be received from a user, and the method may authenticate the communication proxy with the server by sending credentials of the user to the server. To prevent spoofing, access control to the inter-process communication channel may be controlled by file system security on the client system. For example, sending the first request from the first transitory process to the communication proxy over the inter-process communication channel may include accessing the inter-process communication channel using a file system on the client system, and the inter-process communication channel may be referenced by an inter-process communication file.

The method may further include, generating the inter-process communication file based on at least one of: 1) a user account on the client system, the first command having been received under the user account on the client system, 2) a user account on the server used to authenticate the communication proxy with the server, or 3) an authentication service (e.g., a Lightweight Directory Access Protocol server) used to authenticate the communication proxy with the server.

The method may further include applying at least one access control restriction to the inter-process communication channel to prevent unauthorized access to the inter-process communication channel. For example, the method may allow read, write, and execute privileges to the user and no others (e.g., by setting the permission for the inter-process communication file referencing the inter-process communication channel to 700 or -rwx - - - ).

To further prevent any kind of spoofing, the method may also include detecting at least one of the following: 1) modification of the inter-process communication channel (e.g., modification of the inter-process communication file), 2) removal of the inter-process communication channel (e.g., removal of the inter-process communication file), and 3) modification of the access control restriction. The method may also include performing, based on the detecting, at least one of the following: 1) closing the connection between the communication proxy and the server, 2) reestablishing the connection between the communication proxy and the server, 3) stopping the communication proxy, 4) re-initializing the communication proxy, and 5) closing the inter-process communication channel.

The method may further include receiving, at the communication proxy, a response to the first request from the server via the connection between the communication proxy and the server, and relaying the response to the first transitory process over the inter-process communication channel.

The method may also include closing the connection between the communication proxy and the server after a predefined time interval. In certain embodiments, the first transitory process may initialize the communication proxy, and the inter-process communication channel may comprise a named pipe, a memory-mapped file, and/or a UNIX domain socket.

In certain embodiments, a system for handling client-server communications may include: 1) a communication proxy programmed to relay communications between a server and transitory processes on a client system, 2) an initialization module programmed to initialize, on the client system, the communication proxy, 3) a communication-channel-management module programmed to establish an inter-process communication channel configured to enable communication between the communication proxy and the transitory processes, establish a connection between the communication proxy and the server, and authenticate the communication proxy with the server, 4) a request-identification module programmed to receive, at the client system, a first command whose execution involves sending a first request to the server from a first transitory process associated with the first command, 5) a request-dispatch module programmed to send the first request from the first transitory process to the communication proxy over the inter-process communication channel, and 6) a communication-routing module programmed to relay the first request to the server via the connection between the communication proxy and the server.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for handling client-server communications. Embodiments of the instant disclosure may improve the handling of client-server connections by using a communication proxy (e.g., an intermediate process) that keeps active an authenticated connection between a client system and a server. As a result, two or more short-lived processes on a client system may communicate with a server over the same connection, saving the time and resources involved in reestablishing, authenticating, and/or cleaning up multiple connections between the client system and the server.

Figure 1:
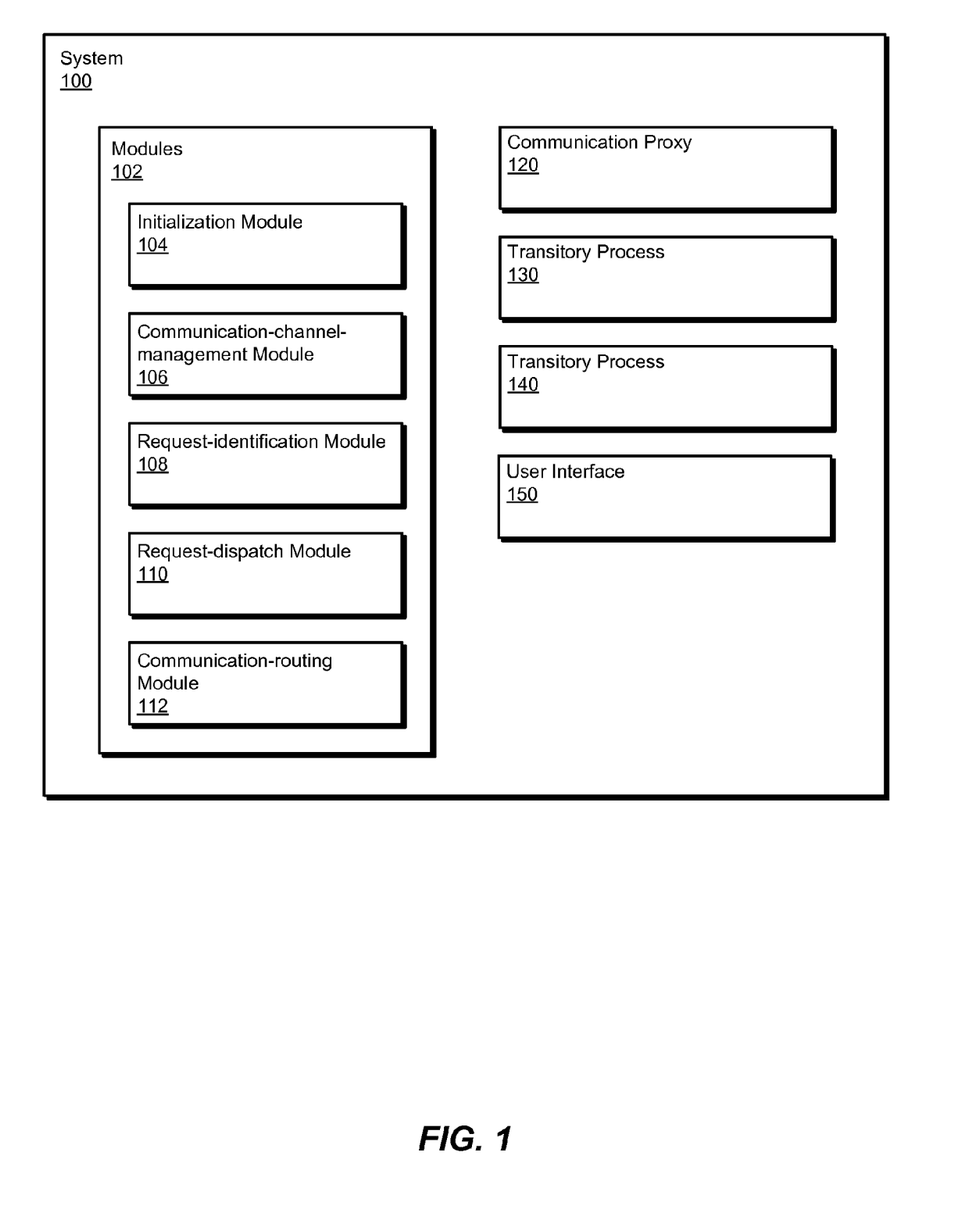
FIG. 1 is a block diagram of an exemplary system for handling client-server communications.
Figure 2:
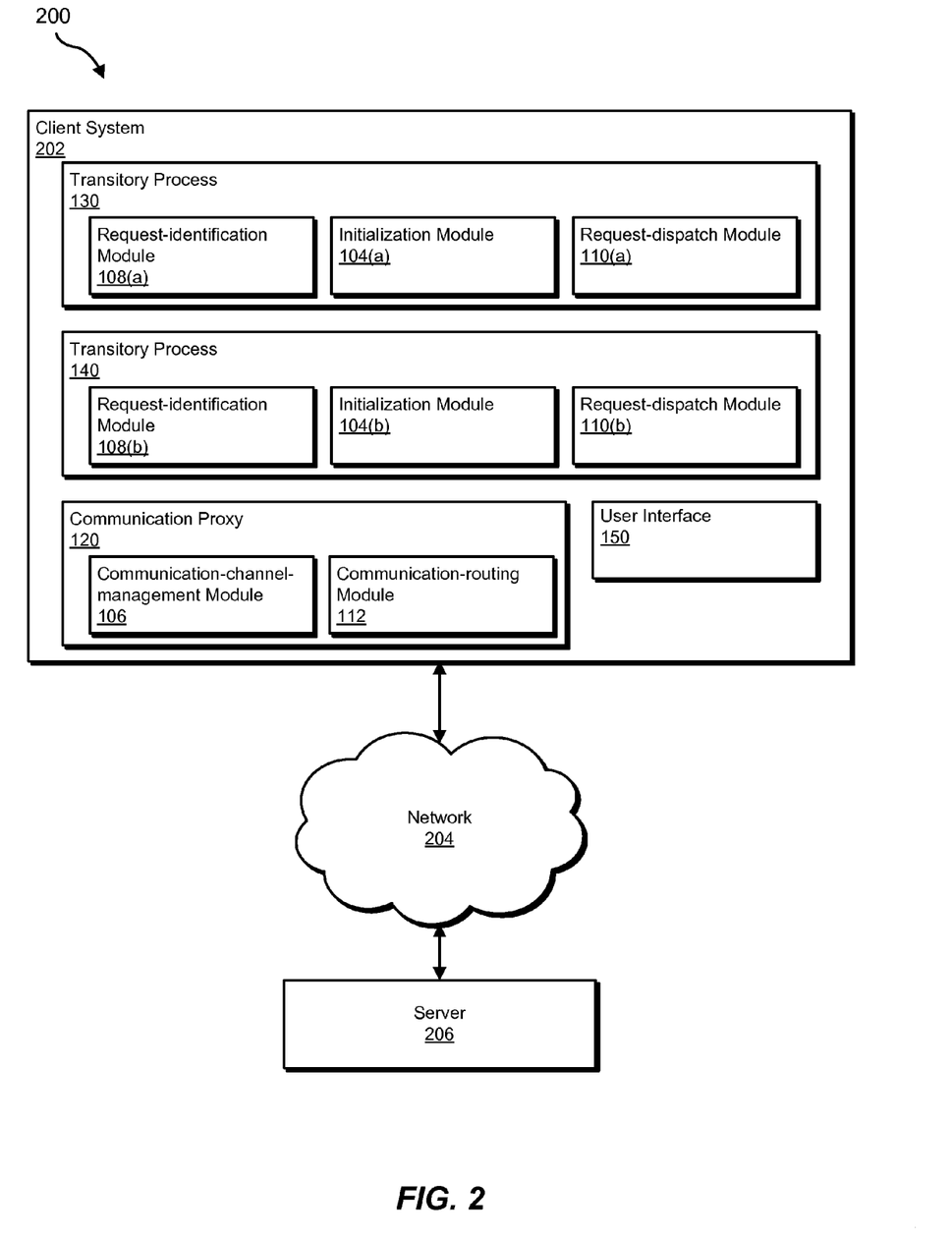
FIG. 2 is a block diagram of another exemplary system for handling client-server communications.

The following will provide, with reference to FIGS. 1-2, detailed descriptions of exemplary systems for handling client-server communications. Detailed descriptions of corresponding computer-implemented methods will also be provided in connection with FIGS. 3a, 3b, and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for handling client-server communications. As illustrated in this figure, exemplary system 100 may include one or more modules 102 for performing one or more tasks. For example, and as will be explained in greater detail below, exemplary system 100 may include an initialization module 104 programmed to initialize a communication proxy configured to relay communications between a server and transitory processes on a client system. Exemplary system 100 may also include a communication-channel-management module 106 programmed to 1) establish an inter-process communication channel configured to enable communication between the communication proxy and the transitory processes, 2) establish a connection between the communication proxy and the server, and 3) authenticate the communication proxy with the server.

Exemplary system 100 may also include a request-identification module 108 programmed to receive a first command whose execution involves sending a first request to the server from a first transitory process associated with the first command. System 100 may further include request-dispatch module 110 programmed to send the first request from the first transitory process to the communication proxy over the inter-process communication channel. Exemplary system 100 may also include a communication-routing module 112 programmed to relay the first request to the server via the connection between the communication proxy and the server. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., client system 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a communication proxy 120 programmed to relay communications between a server and transitory processes on a client system. Exemplary system 100 may also include a transitory process 130 and a transitory process 140, both of which may communicate with a server. Exemplary system 100 may also include a user interface 150 for receiving commands from a user.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a client system 202 in communication with a server 206. Client system 202 generally represents any type or form of computing device capable of reading computer-executable instructions. Examples of client system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device. As shown in FIG. 2, client system 202 may also include transitory process 130, transitory process 140, communication proxy 120, and user interface 150.

Although depicted as residing in client system 202, one or more of the modules shown in FIG. 2 may alternatively reside in server 206. For example, one or more of modules 104-112 may reside in server 206. Server 206 generally represents any type or form of computing device that is capable of receiving communications from a client computing device. Examples of server 206 include, without limitation, application servers and database servers configured to provide various database services and/or run certain software applications.

Client system 202 may communicate with server 206 over network 204. Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between client system 202 and server 206.

The following example illustrates how embodiments of the instant disclosure may be implemented in system 200 to handle client-server communications. In this example, server 206 may include a database server processing requests from client system 202. A user, using client system 202, may use user interface 150 to input a first command (e.g., a database query to be run on server 206). The database query command may cause the execution of transitory process 130, which may be responsible for sending the query to server 206 and receiving results from the query. Next, request-identification module 108(a), as part of transitory process 130, may receive the database query from user interface 150. In addition, initialization module 104(a), also part of transitory process 130, may initialize communication proxy 120 on client system 202 by forking a child process comprising communication proxy 120 and may configure communication proxy 120 to relay communications (including all database queries) between client system 202 and server 206. While shown as part of transitory process 130 in FIG. 2, initialization module 104(a) and/or request-identification module 108(a) may be independent from transitory process 130 in other embodiments.

As part of the initialization of communication proxy 120, the following may occur: 1) communication-channel-management module 106, as part of communication proxy 120, may establish a connection between communication proxy 120 and server 206 via network 204 and may authenticate communication proxy 120 with server 206, 2) communication-channel-management module 106 may also establish an inter-process communication channel and configure the inter-process communication channel to enable communication between communication proxy 120 and transitory processes on client system 202 (e.g., transitory processes 130 and 140), and 3) communication-routing module 112, as part of communication proxy 120, may begin listening for communications sent to communication proxy 120 over the inter-process communication channel.

Next, request-dispatch module 110(a), as part of transitory process 130, may connect to the inter-process communication channel and send the database query to communication proxy 120 over the inter-process communication channel connection, and communication-routing module 112 may receive and then relay the database query to server 206 using the connection made via network 204. After server 206 processes the database query, server 206 may return the results from the query to communication-routing module 112, which may then relay the results to transitory process 130 over the inter-process communication channel. Finally, transitory process 130 may display the results from the query to the user using user interface 150.

After returning the query results to transitory process 130, communication proxy 120 may continue to run, the inter-process communication channel may still exist, and the connection between communication proxy 120 and server 206 may remain open, even if transitory process 130 terminates. Consequently, additional communications from one or more other transitory processes may be sent to server 206 without the initialization, establishment, and authentication steps previously mentioned. For example, the user may again use user interface 150 to input a second command (e.g., an update to a record in the database located on server 206). The update command may execute transitory process 140, which may be responsible for sending the update to server 206 and receiving a confirmation reply from server 206. Next, request-identification module 108(b), as part of transitory process 140, may receive the update command from user interface 150, and initialization module 104(b), also part of transitory process 140, may determine that communication proxy 120 is running on client system 202.

Once initialization module 104(b) verifies that communication proxy 120 is running, request-dispatch module 110(b), as part of transitory process 140, may connect to the inter-process communication channel and send an update request to communication proxy 120. Communication-routing module 112 may receive and then relay the update request to server 206 using the connection made via network 204. After server 206 processes the update request, server 206 may respond with a confirmation message, and communication-routing module 112 may relay the confirmation to transitory process 140 over the inter-process communication channel. Finally, transitory process 140 may display the confirmation to the user using user interface 150.

Figure 3A:
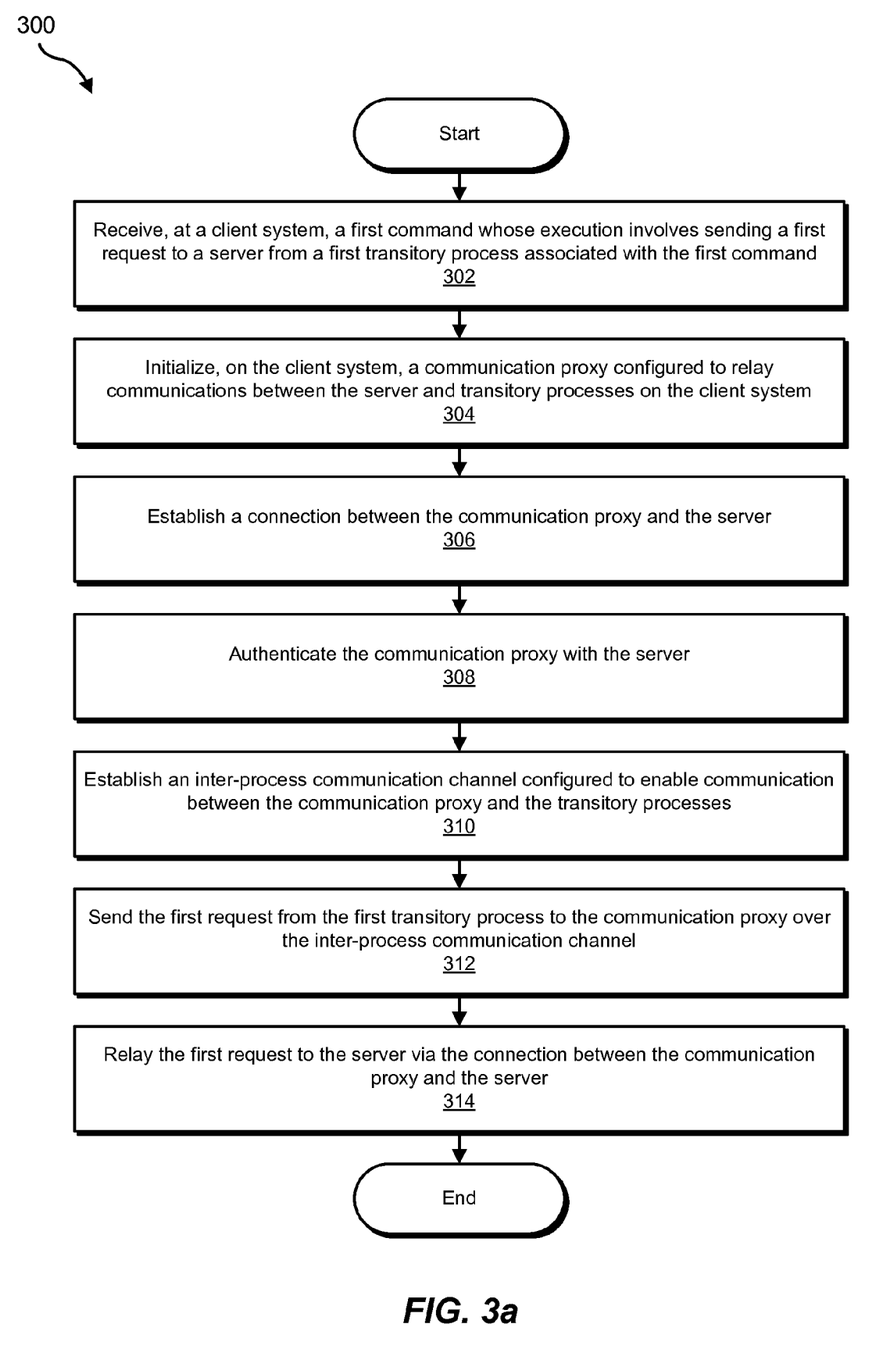
FIG. 3a is a flow diagram of an exemplary method for handling client-server communications.

FIG. 3a is a flow diagram of an exemplary computer-implemented method 300 for handling client-server communications. The steps shown in FIG. 3a may be performed by any suitable computer-executable code and/or computing system. In some embodiments, the steps shown in FIG. 3a may be performed by one or more of the components of system 100 in FIG. 1 and/or system 200 in FIG. 2.

As illustrated in FIG. 3a, at step 302 one or more of the systems described herein may receive, at a client system, a first command whose execution involves sending a first request to a server from a first transitory process (e.g., a short lived client process) associated with the first command. For example, at step 302 request-identification module 108(a) may receive, at client system 202, a first command whose execution involves sending a first request to server 206 from transitory process 130. Request-identification module 108(a) may receive the first command in a variety of ways. For example, request-identification module 108(a) may receive the first command from a user through user interface 150 (e.g., a command-line interface or a graphical user interface). In one example, a user may use user interface 150 to select or input the command. Alternatively, request-identification module 108(a) may receive the first command from a process running on client system 202 or from a process running on a remote device (e.g., server 206).

As used herein, the term "command" may refer to any instruction that directs a process to perform a specific task. Examples of a command may include, without limitation, an instruction to query a database on a server, to start an application on a server, to stop an application on a server, and/or to modify settings on a server. Furthermore, the phrase "transitory process" may refer to any computing process that performs one or more tasks. Examples of a transitory process may include, without limitation, a method, a function, an application, or a subroutine. For example, a transitory process may include a short-lived client process responsible for sending a request to a server and/or receiving a response from a server. A request may include any communication sent from a client to a server. For example, a request may include, without limitation, a message, a query, and/or a request for a resource.

At step 304 of FIG. 3a, one or more of the systems described herein may initialize, on the client system, a communication proxy configured to relay communications (e.g., requests and responses sent between a client and a server) between the server and transitory processes on the client system. For example, initialization module 104(a) may initialize, on client system 202, communication proxy 120 and may configure communication proxy 120 to relay communications between server 206 and transitory processes on client system 202. Initialization module 104(a) may initialize communication proxy 120 in a variety of ways. For example, initialization module 104(a) may fork or spawn a child process that comprises communication proxy 120. Alternatively, initialization module 104(a) may start, execute, or run an intermediate process or a separate stand-alone application that comprises communication proxy 120. In one example, initialization module 104(a) may start communication proxy 120 as a daemon process, as a background process, or a service.

As part of initializing communication proxy 120, initialization module 104(a) may provide communication proxy 120 with a variety of information that may be used to 1) establish a connection with server 206 (e.g., a Uniform Resource Identifier (URI) of server 206, an IP address of server 206, a port number, and/or a communication protocol used by server 206), 2) establish a inter-process communication channel (e.g., access control restrictions, an inter-process communication channel type, and/or a user account on client system 202 under which the first command was received), 3) authenticate communication proxy 120 with server 206 (e.g., a user account on server 206 and/or an authentication service on server 206), and/or 4) relay communications between server 206 and transitory processes on client system 202.

At step 306 of FIG. 3a, one or more of the systems described herein may establish a connection between the communication proxy and the server. For example, communication-channel-management module 106 may establish a connection between communication proxy 120 and server 206 via network 204. Communication-channel-management module 106 may establish the connection in a variety of ways. For example, communication-channel-management module 106 may establish the connection using Transmission Control Protocol (TCP), Stream Control Transmission Protocol (SCTP), Datagram Congestion Control Protocol (DCCP), any other communication protocol, and/or any other suitable method of client-server communication exchange. In one example, communication-channel-management module 106 may also secure the connection between communication proxy 120 and server 206. Communication-channel-management module 106 may secure the connection by exchanging encryption keys with server 206 and encrypting all communications sent across the connection.

Figure 4:
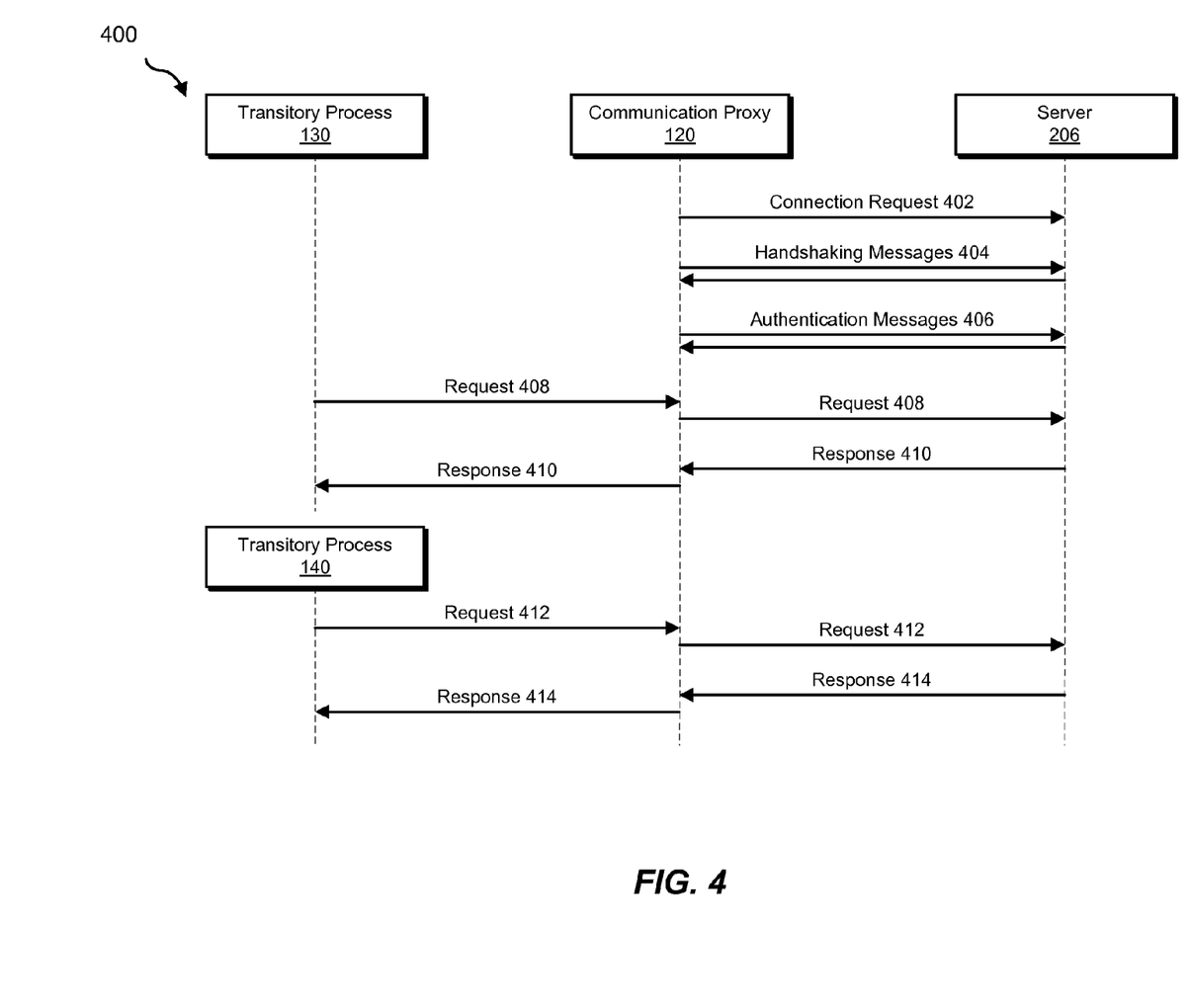
FIG. 4 is a block diagram illustrating a series of client-server communications.

FIG. 4 is a sequence diagram illustrating a series of client-server communications. As shown in FIG. 4, communication proxy 120 may establish a connection with server 206 on behalf of transitory process 130. In one example, as shown in FIG. 4, connection request 402 and handshaking messages 404 may be part of establishing a connection between communication proxy 120 and server 206. For example, communication-channel-management module 106, on client system 202, may establish the connection by sending connection request 402 to server 206 and exchanging handshaking messages 404 with server 206 to synchronize and set up the connection.

Returning to FIG. 3a, at step 308, one or more of the systems described herein may authenticate the communication proxy with the server. For example, communication-channel-management module 106 may authenticate communication proxy 120 with server 206. Communication-channel-management module 106 may authenticate communication proxy 120 in a variety of ways. For example, communication-channel-management module 106 may send information to server 206 that allows server 206 to identify and/or verify communication proxy 120. In one example, as shown in FIG. 4, communication-channel-management module 106 may exchange authentication messages 406 (e.g., user credentials) with server 206 to authorize communication proxy 120.

In another example, server 206 may utilize one or more authentication services to authenticate communication proxy 120. An authentication service may include any method used for authentication or source of authentication information (e.g., a Lightweight Directory Access Protocol (LDAP), Network Information Service (NIS), or a Network Information Service Plus (NIS+) based authentication service). For example, an authentication service may maintain a list of users who are allowed to connect to, communicate with, and/or perform operations or commands on server 206. In one example, communication proxy 120 may be communicating with server 206 under the context of a user in the list of users. For example, as part of authenticating communication proxy 120, communication-channel-management module 106 may require the user that input the first command to provide user credentials. Therefore, authenticating communication proxy 120 may include sending credentials of the user to server 206. In another example, user credentials may be associated with transitory process 130. For example, transitory process 130 may require the user that input the first command to provide user credentials. Transitory process 130 may send the user credentials associated with transitory process 130 to communication proxy 120 (e.g., as part of initializing communication proxy 120 or over the inter-process communication channel), and communication proxy 120 may send the user credentials to server 206 to authenticate communication proxy 120. User credentials may include any information that allows server 206 to determine and/or validate the user's identity. Examples of user credentials may include, without limitation, a username, a user ID, a password, a key, a certificate, a name of an authentication service, a domain name, and/or any other suitable information that identifies the user.

In one example, communication-channel-management module 106 may authenticate communication proxy 120 with server 206 by authenticating the connection between communication proxy 120 and the server with the server. For example, communication-channel-management module 106 may authenticate one or more connections between communication proxy 120 and server 206, where each connection uses different authentication information (e.g., a different user account on server 206) to authenticate the connection with server 206.

At step 310 of FIG. 3*a*, one or more of the systems described herein may establish an inter-process communication channel configured to enable communication between the communication proxy and the transitory processes. For example, communication-channel-management module 106 may, as part of communication proxy 120, establish an inter-process communication channel configured to enable communication between communication proxy 120 and transitory process 130 and/or transitory process 140 on client system 202. Communication-channel-management module 106 may establish the inter-process communication channel in a variety of ways. For example, communication-channel-management module 106 may create or setup a file, a signal, a socket, a message queue, a pipe, a named pipe, shared memory, a memory-mapped file, a UNIX domain socket, and/or any other suitable means of inter-process communication.

In one example, communication-channel-management module 106 may establish an inter-process communication channel using a file system on client system 202 and may reference the inter-process communication channel with an inter-process communication file. For example, communication-channel-management module 106(*a*) may create a UNIX domain socket and bind the UNIX domain socket to an inter-process communication file.

In one example, communication-channel-management module 106 may generate the inter-process communication file that refers to the inter-process communication channel based on: 1) a user account on client system 202 (the first command having been received under the user account), 2) a user account on server 206 (e.g., the user account used to authenticate communication proxy 120 with server 206 at step 308), and/or an authentication service of server 206 (e.g., the authentication service used to authenticate communication proxy 120 with server 206 at step 308). In another example, communication-channel-management module 106 may generate the inter-process communication file that refers to the inter-process communication channel based solely on the user account on client system 202. Communication-channel-management module 106 may generate the inter-process communication file in a variety of ways. For example, if a user on client system 202 with username hetal fires the first command, and communication proxy 120 is authenticated using the credentials of a user on server 206 with username ptyagi@mydomain and an authentication service named unixpwd, then communication-channel-management module 106 may generate ~hetal/.session/ptyagi_mydomain_unixpwd (i.e., a file path under the user's home directory) as the inter-process communication file.

In another example the inter-process communication channel may be associated with the connection between communication proxy 120 and server 206 such that only communications sent to the inter-process communication channel are ever sent over the connection between communication proxy 120 and server 206.

In some embodiments, communication-channel-management module 106 may also prevent unauthorized access to the inter-process communication channel by applying at least one access control restriction to the inter-process communication channel. Applying access control restrictions may include limiting access to the inter-process communication channel based on various criteria. For example, communication-channel-management module 106 may allow only the user under whose account the first command was received to access the inter-process communication channel. In one example, if the inter-process communication channel is a UNIX domain socket, communication-channel-management module 106 may allow read, write, and execute privileges to the user and no others. In another example, communication-channel-management module 106 may utilize file system security (e.g., UNIX file system security) to prevent unauthorized access to the inter-process communication channel. For example, communication-channel-management module 106 may set the permission for the inter-process communication file referencing the inter-process communication channel to 700 or -rwx - - -, the user being the owner of the inter-process communication file.

In another example, communication-channel-management module 106 may further prevent unauthorized access to the inter-process communication channel by detecting: 1) modification of the inter-process communication channel (e.g., modification of the inter-process communication file referencing the inter-process communication channel), 2) removal of the inter-process communication channel (e.g., deletion of the inter-process communication file), and/or 3) modification of the access control restrictions (e.g., allowing access to others by changing file permissions).

In one example, communication-channel-management module 106 may, based on the detecting, perform one or more of the following: 1) close the connection between communication proxy 120 and server 206, 2) reestablish the connection between communication proxy 120 and server 206, 3) stop communication proxy 120, 4) restart communication proxy 120, 5) close the inter-process communication channel, and/or 6) reestablish the inter-process communication channel.

Although step 302 is shown as occurring before steps 304-310, step 302 may be performed after one or more of steps 304-310. For example, request-identification module 108(*a*) may receive the first command after initialization module 104(*a*) initializes communication proxy 120 and after communication-channel-management module 106 establishes the connection between communication proxy 120 and server 206, authenticates communication proxy 120 with server 206, and establishes the inter-process communication channel between communication proxy 120 and transitory processes 130 and 140.

At step 312 of FIG. 3*a*, one or more of the systems described herein may send the first request from the first transitory process to the communication proxy over the inter-process communication channel. For example, request-dispatch module 110(*a*) may, as part of transitory process 130, send the first request from transitory process 130 to communication proxy 120 over the inter-process communication channel. In one example, as illustrated in FIG. 4, request-dispatch module 110(*a*) may send request 408 from transitory process 130 to communication proxy 120 over the inter-process communication channel. Request-dispatch module 110(*a*) may send the first request in a variety of ways. For example, sending the first request may include first connecting to the inter-process communication channel and then writing the request to the inter-process communication channel.

In one example, request-dispatch module 110(a) may access the inter-process communication channel using a file system on client system 202. In this example, the inter-process communication channel may be referenced by an inter-process communication file. Request-dispatch module 110(a) may generate the file path of the inter-process communication file using the same algorithm described in step 310 of FIG. 3a. For example, request-dispatch module 110(a) may generate ~hetal/.session/ptyagi_mydomain_unixpwd, which is the file path of the inter-process communication file created at step 310 by communication-channel-management module 106, and then may open a connection to the inter-process communication channel by connecting to ~hetal/.session/ptyagi_mydomain_unixpwd. After connecting to the inter-process communication channel, request-dispatch module 110(a) may then send the first request to communication proxy 120 by writing the first request to a socket or file descriptor identified by the inter-process communication file ~hetal/.session/ptyagi_mydomain_unixpwd.

At step 314 of FIG. 3a, one or more of the systems described herein may relay the first request to the server via the connection between the communication proxy and the server. For example, communication-routing module 112 may, as part of communication proxy 120, relay the first request to server 206 via the connection between communication proxy 120 and server 206. In one example, as illustrated in FIG. 4, communication-routing module 112 may receive, from request-dispatch module 110(a), request 408 and then may relay request 408 from communication proxy 120 on client system 202 to server 206. Communication-routing module 112 may relay the first request in a variety of ways. For example, communication-routing module 112 may listen for a request to be sent to the inter-process communication channel, read the request from the inter-process communications channel, and send the request to server 206. Communication-routing module 112 may listen for a request by polling the inter-process communication channel for any data written to the inter-process communication channel.

In one example, communication-routing module 112 may also receive a response (e.g., results from a database query) to the first request from server 206 via the connection between communication proxy 120 and server 206. Communication-routing module 112 may then relay the response to transitory process 130 over the inter-process communication channel. For example, as illustrated in FIG. 4, server 206 may send response 410 to communication proxy 120, where it may be received by communication-routing module 112. Then, communication-routing module 112 may relay response 410 to request-dispatch module 110(a) of transitory process 130 over the inter-process communication channel. In one example, request-dispatch module 110(a) may then disconnect from the inter-process communication channel.

Upon completion of steps 302-314, additional requests may be sent to server 206 over the connection established between communication proxy 120 and server 206 in step 306. In one example, communication proxy 120 may continue to run, and the inter-process communication channel and the connection between communication proxy 120 and server 206 may remain open. Consequently one or more of the systems described herein may reuse communication proxy 120, the inter-process communication channel, and the connection with server 206 to send additional communications to server 206 without the need to repeat the initialization, establishment, and authentication steps previously mentioned (e.g., steps 304-310 in FIG. 3a).

Figure 3B:
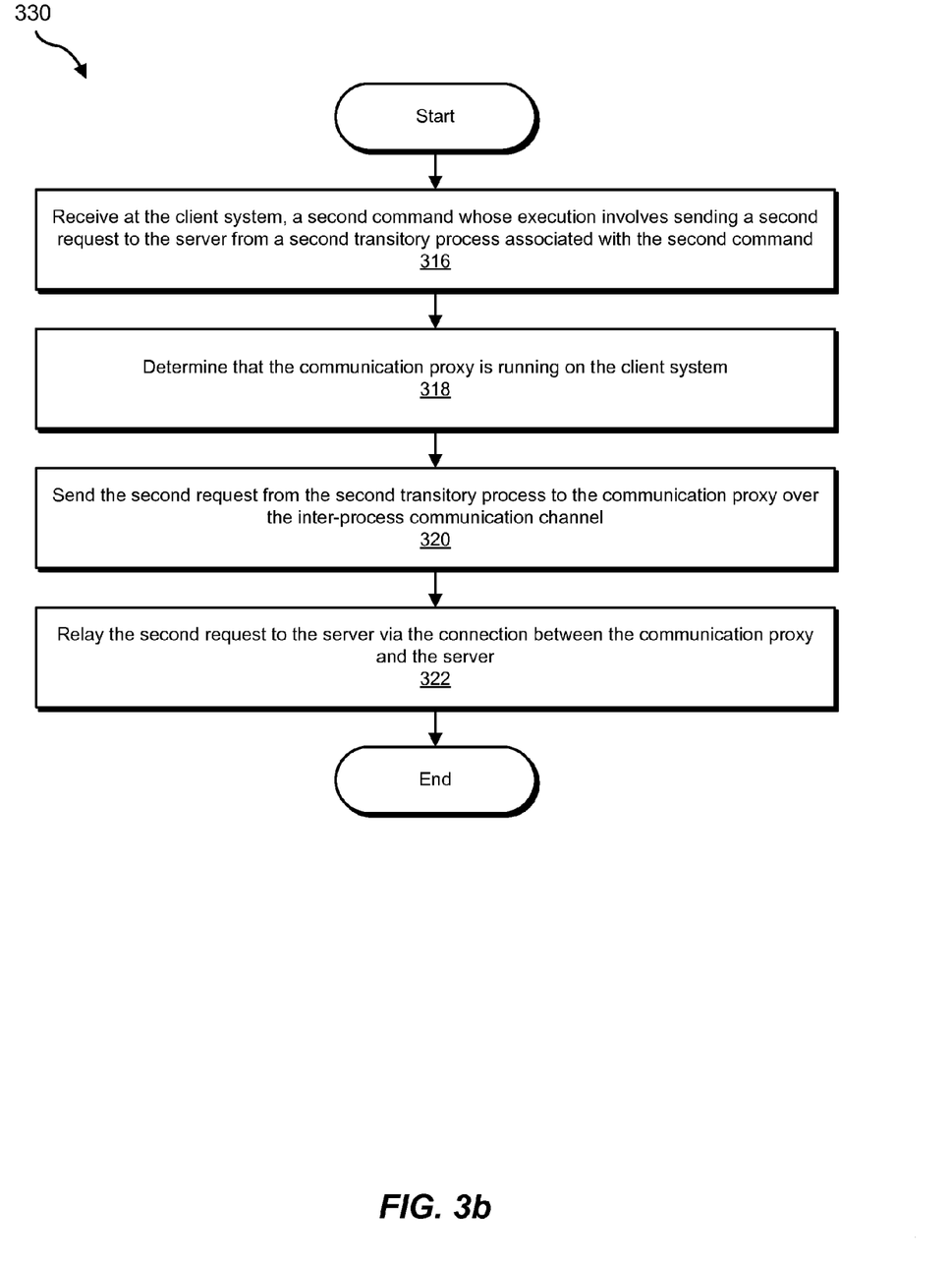
FIG. 3b is a flow diagram of an exemplary method for handling client-server communications.

For example, as illustrated in FIG. 3b, at step 316, one or more of the systems described herein may receive at the client system, a second command whose execution involves sending a second request to the server from a second transitory process associated with the second command. In some embodiments, at step 316 request-identification module 108(b) may, as part of transitory process 140, receive, at client system 202, a second command whose execution involves sending a second request to server 206 from transitory process 140. Step 316 may be similar to step 302 of FIG. 3a. Therefore, the discussion of step 302 may also apply to step 316.

At step 318 of FIG. 3b, one or more of the systems described herein may determine that the communication proxy is running on the client system. For example, initialization module 104(b) may, as part of transitory process 140, determine that communication proxy 120 is running on client system 202. Initialization module 104(b) may determine that communication proxy 120 is running in a variety of ways. In one example, initialization module 104(b) may determine that communication proxy 120 is running by attempting to connect to the inter-process communication channel established in step 310 (e.g., by attempting to connect to the inter-process communication file), by attempting to communicate with communication proxy 120, by examining a list of processes running on client system 202, and/or by using any other means for determining that communication proxy 120 is running.

In one example, initialization module 104(b) may determine that communication proxy 120 is running on client system 202 by generating the file path of the inter-process communication file using the same algorithm described in step 310 of FIG. 3a. For example, initialization module 104(b) may generate ~hetal/.session/ptyagi_mydomain_unixpwd, which is the file path of the inter-process communication file created at step 310 by communication-channel-management module 106. Initialization module 104(b) may and then attempt to connect to ~hetal/.session/ptyagi_mydomain_unixpwd.

At step 320 of FIG. 3b, one or more of the systems described herein may send the second request from the second transitory process to the communication proxy over the inter-process communication channel. For example, request-dispatch module 110(b) may, as part of transitory process 140, send the second request from transitory process 140 to communication proxy 120 over the inter-process communication channel. In one example, as illustrated in FIG. 4, request-dispatch module 110(b) may send request 412 from transitory process 140 to communication proxy 120 over the inter-process communication channel.

In one example, request-dispatch module 110(b) may access the inter-process communication channel using a file system on client system 202. In this example, the inter-process communication channel may be referenced by an inter-process communication file. Request-dispatch module 110(b) may generate the file path of the inter-process communication file using the same algorithm described in step 310 of FIG. 3a. For example, request-dispatch module 110(b) may generate ~hetal/.session/ptyagi_mydomain_unixpwd, which is the file path of the inter-process communication file created at step 310 by communication-channel-management module 106, and then open a connection to the inter-process communication channel by connecting to ~hetal/.session/ptyagi_mydomain_unixpwd. After connecting to the inter-process communication channel, request-dispatch module 110(b) may then send the second request to communication proxy 120 by writing the second request to the socket or file descriptor identified by ~hetal/.session/ptyagi_mydomain_unixpwd. Step 320 may be similar to step 312 of FIG. 3a. Therefore, the discussion of step 312 may also apply to step 320.

At step 322 of FIG. 3b, one or more of the systems described herein may relay the second request to the server via the connection between the communication proxy and the server. For example, communication-routing module 112 may, as part of communication proxy 120, relay the second request to server 206 via the connection between communication proxy 120 and server 206. In one example, as illustrated in FIG. 4, communication-routing module 112 may receive from request-dispatch module 110(b) request 412, and then relay request 412 from communication proxy 120 on client system 202 to server 206. Step 322 may be similar to step 314 of FIG. 3a. Therefore, the discussion of step 314 may also apply to step 322.

In one example, communication-routing module 112 may also receive a response (e.g., results from a database query) to the second request from server 206 via the connection between communication proxy 120 and server 206. Communication-routing module 112 may then relay the response to transitory process 140 over the inter-process communication channel. For example, as illustrated in FIG. 4, server 206 may send response 414 to communication proxy 120, where it may be received by communication-routing module 112. Next, communication-routing module 112 may relay response 414 to request-dispatch module 110(b) of transitory process 140 over the inter-process communication channel. In one example, request-dispatch module 110(b) may then disconnect from the inter-process communication channel.

As mentioned above, the second request may be sent to server 206 without re-authenticating communication proxy 120 with server 206. Because authentication information and access control information on server 206 may change over time, one or more of the systems described herein may close the connection between communication proxy 120 and server 206 after a predefined time interval. For example, communication-channel-management module 106 may close the connection between communication proxy 120 and server 206 after a predefined time interval. In one example, communication-channel-management module 106 may close the connection after one minute, one hour, one day, a time interval specified by the server, or any other time period. In another example, server 206 may close the connection after the predefined time interval.

Figure 5:
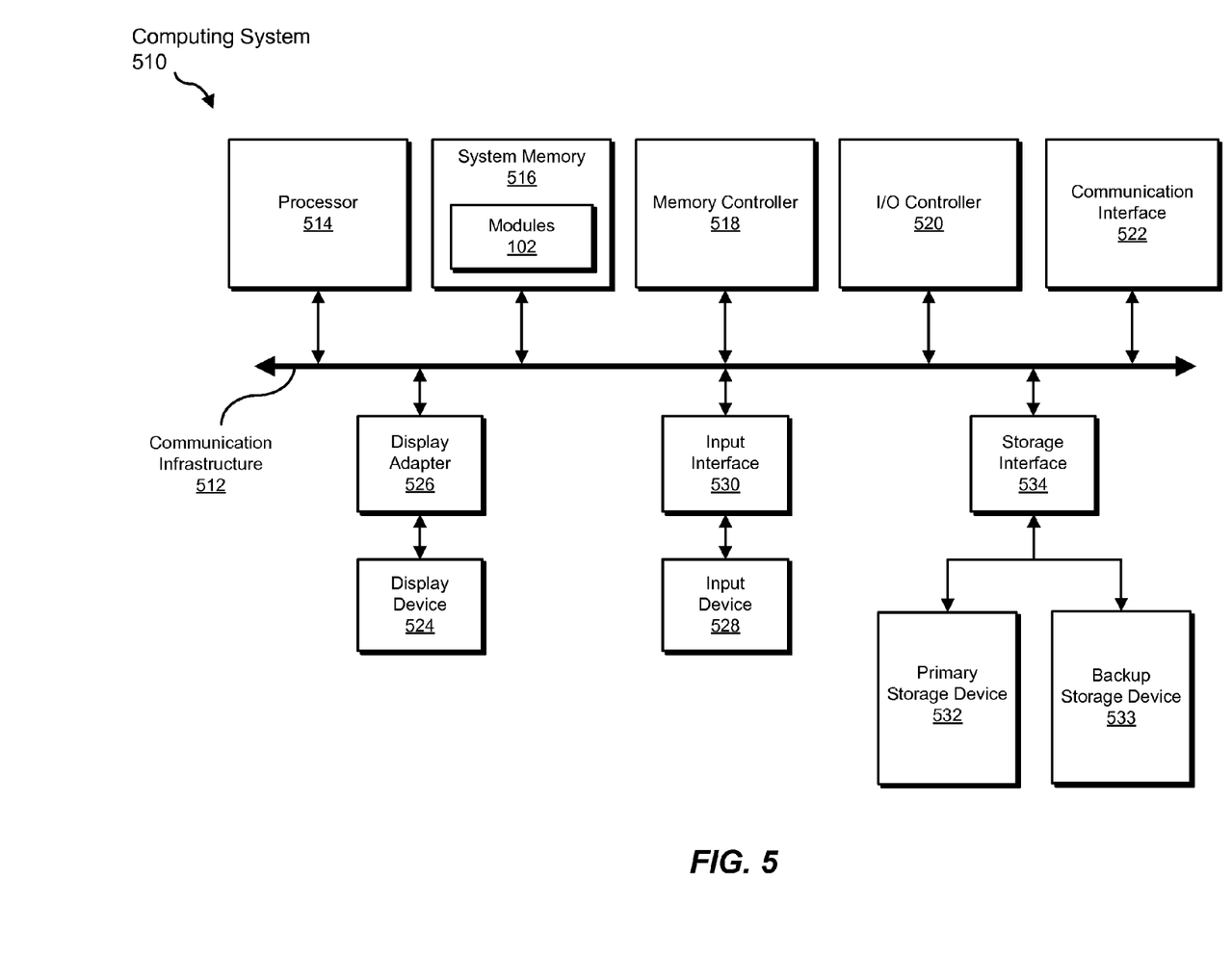
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the receiving, initializing, establishing, authenticating, sending, relaying, determining, accessing, generating, applying, performing, closing, and/or stopping steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as receiving, initializing, establishing, authenticating, sending, relaying, determining, accessing, generating, applying, performing, closing, and/or stopping.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the receiving, initializing, establishing, authenticating, sending, relaying, determining, accessing, generating, applying, performing, closing, and/or stopping steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the receiving, initializing, establishing, authenticating, sending, relaying, determining, accessing, generating, applying, performing, closing, and/or stopping steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the receiving, initializing, establishing, authenticating, sending, relaying, determining, accessing, generating, applying, performing, closing, and/or stopping steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the receiving, initializing, establishing, authenticating, sending, relaying, determining, accessing, generating, applying, performing, closing, and/or stopping steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
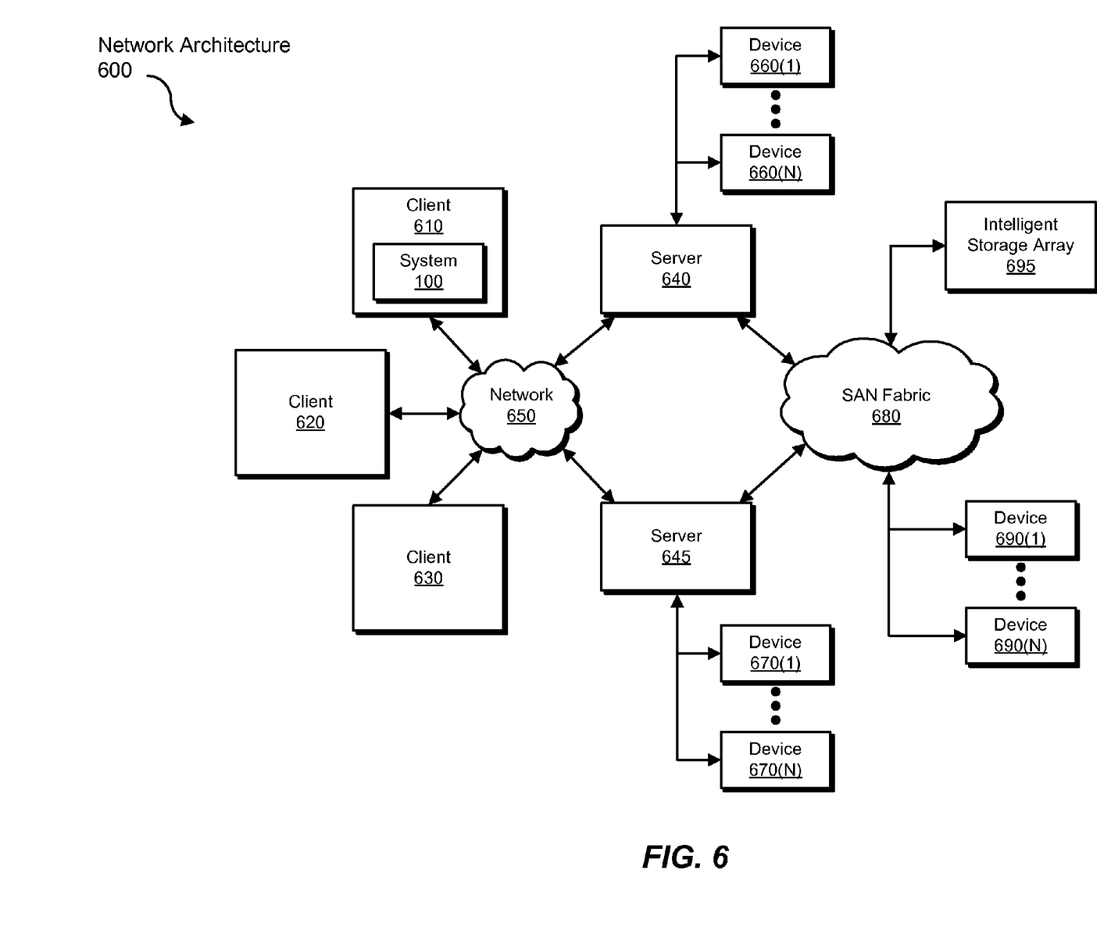
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the receiving, initializing, establishing, authenticating, sending, relaying, determining, accessing, generating, applying, performing, closing, and/or stopping steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for handling client-server communications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, initialization module 106 may transform a portion of a client system into a communication proxy configured to relay communications between a server and transitory processes on the client system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for handling client-server communications, at least a portion of the method being performed by a computing device comprising at least one processor, the method comprising:
   receiving, at a client system, a first command whose execution involves sending a first request to a server from a first transitory process associated with the first command, wherein the first command is received from a user;
   initializing, on the client system, a communication proxy configured to relay communications between the server and transitory processes on the client system;
   establishing a connection between the communication proxy and the server;
   authenticating the communication proxy with the server by sending credentials of the user to the server;
   establishing an inter-process communication channel configured to enable communication between the communication proxy and the transitory processes;
   applying at least one access control restriction to the inter-process communication channel to prevent unauthorized access to the inter-process communication channel;
   sending the first request from the first transitory process to the communication proxy over the inter-process communication channel;
   relaying the first request to the server via the connection between the communication proxy and the server.

2. The computer-implemented method of claim 1, further comprising:
   receiving, at the client system, a second command whose execution involves sending a second request to the server from a second transitory process associated with the second command;
   determining that the communication proxy is running on the client system;
   sending the second request from the second transitory process to the communication proxy over the inter-process communication channel;
   relaying the second request to the server via the connection between the communication proxy and the server.

3. The computer-implemented method of claim 1, wherein sending the first request from the first transitory process to the communication proxy over the inter-process communication channel comprises accessing the inter-process communication channel using a file system on the client system, the inter-process communication channel being referenced by an inter-process communication file.

4. The computer-implemented method of claim 3, further comprising generating the inter-process communication file based on at least one of:
   a user account on the client system, the first command having been received under the user account on the client system;
   a user account on the server used to authenticate the communication proxy with the server;
   an authentication service used to authenticate the communication proxy with the server.

5. The computer-implemented method of claim 1, further comprising detecting at least one of the following:
   modification of the inter-process communication channel;
   removal of the inter-process communication channel;
   modification of the access control restriction.

6. The computer-implemented method of claim 5, further comprising performing, based on the detecting, at least one of the following:
   closing the connection between the communication proxy and the server;
   reestablishing the connection between the communication proxy and the server;
   stopping the communication proxy;
   reinitializing the communication proxy;
   closing the inter-process communication channel;
   reestablishing the inter-process communication channel.

7. The computer-implemented method of claim 1, further comprising:
   receiving, at the communication proxy, a response to the first request from the server via the connection between the communication proxy and the server;
   relaying the response to the first transitory process over the inter-process communication channel.

8. The computer-implemented method of claim 1, further comprising closing the connection between the communication proxy and the server after a predefined time interval.

9. The computer-implemented method of claim 1, wherein the first transitory process initializes the communication proxy.

10. The computer-implemented method of claim 1, wherein the inter-process communication channel comprises at least one of:
    a named pipe;
    a memory-mapped file;
    a Unix domain socket.

11. A system for handling client-server communications, the system comprising:
    a communication proxy programmed to relay communications between a server and transitory processes on a client system;
    an initialization module programmed to initialize, on the client system, the communication proxy;
    a communication-channel-management module programmed to:
    establish a connection between the communication proxy and the server;
    authenticate the communication proxy with the server by sending credentials of a user to the server;
    establish an inter-process communication channel configured to enable communication between the communication proxy and the transitory processes;
    apply at least one access control restriction to the inter-process communication channel to prevent unauthorized access to the inter-process communication channel;
    a request-identification module programmed to receive, at the client system, a first command whose execution involves sending a first request to the server from a first transitory process associated with the first command, wherein the first command is received from the user;
    a request-dispatch module programmed to send the first request from the first transitory process to the communication proxy over the inter-process communication channel;

a communication-routing module programmed to relay the first request to the server via the connection between the communication proxy and the server;

at least one processor configured to execute the initialization module, the communication-channel-management module, the request-identification module, the request-dispatch module, and the communication-routing module.

12. The system of claim 11, wherein:

the request-identification module is further programmed to receive, at the client system, a second command whose execution involves sending a second request to the server from a second transitory process associated with the second command;

the initialization module is further programmed to determine that the communication proxy is running on the client system;

the request-dispatch module is further programmed to send the second request from the second transitory process to the communication proxy over the inter-process communication channel;

the communication-routing module is further programmed to relay the second request to the server via the connection between the communication proxy and the server.

13. The system of claim 11, wherein:

the request-dispatch module is further programmed to send the first request from the first transitory process to the communication proxy over the inter-process communication channel by accessing the inter-process communication channel using a file system on the client system, the inter-process communication channel being referenced by an inter-process communication file.

14. The system of claim 13, wherein:

the communication-channel-management module is further programmed to generate the inter-process communication file based on at least one of:

a user account on the client system, the first command having been received under the user account on the client system;

a user account on the server used to authenticate the communication proxy with the server;

an authentication service used to authenticate the communication proxy with the server.

15. The system of claim 11, wherein the communication-channel-management module is further programmed to detect at least one of the following:

modification of the inter-process communication channel;

removal of the inter-process communication channel;

modification of the access control restriction.

16. A non-transitory computer-readable medium comprising one or more computer-executable instructions that, when executed by a computing device, cause the computing device to:

receive, at a client system, a first command whose execution involves sending a first request to a server from a first transitory process associated with the first command, wherein the first command is received from a user;

initialize, on the client system, a communication proxy configured to relay communications between the server and transitory processes on the client system;

establish an inter-process communication channel configured to enable communication between the communication proxy and the transitory processes;

apply at least one access control restriction to the inter-process communication channel to prevent unauthorized access to the inter-process communication channel;

establish a connection between the communication proxy and the server;

authenticate the communication proxy with the server by sending credentials of the user to the server;

send the first request from the first transitory process to the communication proxy over the inter-process communication channel;

relay the first request to the server via the connection between the communication proxy and the server.

* * * * *